(12) United States Patent
Nakatsugawa (10) Patent No.: US 7,554,636 B2
(45) Date of Patent: Jun. 30, 2009

(54) RETARDATION CONTROL ELEMENT, LIQUID CRYSTAL DISPLAY DEVICE WITH THE RETARDATION CONTROL ELEMENT, METHOD OF PRODUCING THE RETARDATION CONTROL ELEMENT

(75) Inventor: Yuji Nakatsugawa, Matsudo (JP)

(73) Assignee: Dai Nippon Printing, Tokyo (JP)

( * ) Notice: Subject to any disclaimer, the term of this patent is extended or adjusted under 35 U.S.C. 154(b) by 120 days.

(21) Appl. No.: 11/902,623

(22) Filed: Sep. 24, 2007

(65) Prior Publication Data

US 2008/0074595 A1    Mar. 27, 2008

(30) Foreign Application Priority Data

Sep. 25, 2006 (JP) .............................. 2006-258530

(51) Int. Cl.
G02F 1/1335 (2006.01)
(52) U.S. Cl. ...................................... 349/118; 349/117
(58) Field of Classification Search ................. 349/118, 349/117
See application file for complete search history.

(56) References Cited

U.S. PATENT DOCUMENTS

2005/0179003 A1    8/2005    Heckmeier et al.

2006/0152801 A1 *  7/2006    Matsunaga ................... 359/443

FOREIGN PATENT DOCUMENTS

| JP | A 2000-221506 | 8/2000 |
|---|---|---|
| JP | A 2004-524385 | 8/2004 |

* cited by examiner

Primary Examiner—Sung H Pak
Assistant Examiner—Eric Wong
(74) Attorney, Agent, or Firm—Oliff & Berridge, PLC (57) ABSTRACT

The invention provides a retardation control element capable of inhibiting a retardation defect that becomes a cause of light leakage and color shift of a liquid crystal display device from occurring, a method of producing the same, and a liquid crystal display device including such a retardation control element. A method of producing a retardation control element includes: a first step of filtering liquid crystal ink containing crosslinkable liquid crystal molecules with a filter material having a maximum pore diameter in the range of 0.1 to 5 μm; a second step of coating the filtered liquid crystal ink in a thin film on a revolving light-transmitting base material by means of a spin coating method; a third step of, after drying the base material under reduced pressure as needs arise, heating the coated liquid crystal ink to a liquid crystal phase temperature to align the crosslinkable liquid crystal molecules; and a fourth step of photo-polymerizing the aligned crosslinkable liquid crystal molecules each other to form a birefringence functional layer, wherein the second step is carried out with the base material covered with a tight cover.

15 Claims, 1 Drawing Sheet

RETARDATION CONTROL ELEMENT, LIQUID CRYSTAL DISPLAY DEVICE WITH THE RETARDATION CONTROL ELEMENT, METHOD OF PRODUCING THE RETARDATION CONTROL ELEMENT

BACKGROUND OF THE INVENTION

1. Field of the Invention

The present invention relates to a retardation control element including a birefringence functional layer obtained by crosslinking and polymerizing crosslinkable liquid crystal molecules on a light-transmitting base material, a liquid crystal display device with the retardation control element as a display side substrate and a method of producing the retardation control element.

2. Description of the Related Art

A liquid crystal display device, having various advantages such as being easy to make thin and light, able to reduce the consumption power and difficult to cause flickers, is used in various fields such as televisions and medical equipments. The liquid crystal display device switches light by making use of the birefringence property of a driving liquid crystal material. Accordingly, the liquid crystal display device has the viewing angle dependency derived from the birefringence property of the driving liquid crystal material. For this reason, the liquid crystal display device has a problem in that, depending on an angle by which a viewer sees a liquid crystal display screen, light leakage or gradation reversal phenomenon is caused, that is, the viewing angle becomes narrower.

In order to overcome the problem, there has been proposed a liquid crystal display device provided with a retardation control element on an observer side of a liquid crystal cell. The retardation control element controls exit and incident light from the liquid crystal cell formed in such a manner that a driving liquid crystal material is sandwiched between two substrates. In that case, as the retardation control element, film materials obtained by mono-axially or biaxially stretching a film of triacetyl cellulose (TAC) or the like have been used in many cases.

Recently, there has been proposed a method where a crosslinkable liquid crystal material or a polymer liquid crystal material is used to arrange, inside of a liquid crystal cell (in some cases, referred to as "in-cell side"), a birefringence functional layer that imparts predetermined retardation (phase difference) to transmitted light (see Japanese Patent Application Laid-Open (JP-A) No. 2000-221506). In this case, when a birefringence functional layer is arranged inside of a liquid crystal cell, said stretched film and an adhesive layer thereof, which are generally low in the heat resistance, become unnecessary. Accordingly, there are advantages in that high mechanical strength and heat resistance can be obtained and hygroscopic deformation can be suppressed as well.

SUMMARY OF THE INVENTION

A retardation control element is demanded to have various characteristics. One of important characteristics is that no retardation defect is found in an effective display region of an element. This is because, when a retardation defect is found in an element, a polarization state of transmitted light of the portion becomes extraordinary polarized light, and for example, when the element is used in a liquid crystal display device, there is fear that a defect such as light leakage may be caused depending on usage conditions to deteriorate quality of the liquid crystal display device. In many cases, foreign matters trigger the generation of the retardation defect. Accordingly, with the trend toward higher definition of recent liquid crystal display devices, a decrease in content of foreign matters is understood as one of important characteristics demanded on retardation control elements.

A retardation control element may be produced in such a manner that a liquid crystal material containing crosslinkable liquid crystal molecules is coated on an in-cell side of a light transmitting base material, the liquid crystal molecules are aligned to prepare a liquid crystal coating film, followed by photo-polymerizing or thermally polymerizing to fix an alignment state of the liquid crystal molecules to form a birefringence functional layer. In the case of such a retardation control element, in particular, there is fear that foreign matters mingle during coating or curing the liquid crystal material owing to various reasons, thus leading to a problem in that deterioration of the optical performance and the lowering of the yield may be conspicuous.

Typical examples of the kinds of foreign matters and reasons why these mingle include:

(i) initial impurities such as unreacted raw materials and catalysts, which are mingled in a liquid crystal material in advance;

(ii) dry solid resin components that mingle with a liquid crystal material at a discharge port of a coating machine;

(iii) solid resin components generated inside of a liquid crystal coating film owing to crosslinking unevenness of the crosslinkable liquid crystal molecules;

(iv) dusts derived from proteins of human bodies and adhered to a surface of the liquid crystal coating film; and (v) resin precipitates generated on the surface of the liquid crystal coating film owing to drying unevenness of a liquid crystal material coated in a thin film.

Regarding the (i) to (iii), foreign matters mingle inside of the liquid crystal coating film. Accordingly, when , with the foreign matters mingled, the crosslinkable liquid crystal molecules are aligned, followed by crosslinking and polymerizing the liquid crystal molecules each other to form a birefringence functional layer, the liquid crystal molecules are fixed in an insufficient state in the alignment, resulting in lowering the optical performance of the retardation control element.

Furthermore, regarding the (iv) and (v), the foreign matters adhere mainly on the surface of a liquid crystal coating film. Accordingly, when a birefringence functional layer is formed on an in-cell side of a liquid crystal cell, a horizontal alignment film is covered on a top surface of the birefringence functional layer, and further thereon driving liquid crystal molecules are arranged in layer to assemble a liquid crystal cell, there is a problem in that the liquid crystal molecules are disturbed in the drive. That is, because of the presence of the foreign matters, a horizontal alignment film covered on the top surface of the birefringence functional layer locally protrudes toward an in-cell side. For this reason, the alignment property of the driving liquid crystal molecules is disturbed and a thickness of the liquid crystal cell becomes thin only in that portion, resulting in causing problems below. In the case of so-called TN type or VA type liquid crystal display devices, the number of driving liquid crystal molecules present in the thickness thereof decreases to cause variations in an amount of retardation imparted to transmitted light. Furthermore, in the case of so-called IPS type liquid crystal display devices, a distance between the horizontal alignment films that face each other becomes shorter. Therefore, an alignment restriction force operating on driving liquid crystal molecules increases to lower the driving property, which causes problems of light leakage and color shift of a liquid crystal display device, such as variation in the component and intensity of transmitted light.

When transparent substrates are faced at a desired interval to form a liquid crystal cell, a large foreign matter exceeding the desired thickness may be present on a surface or inside of a birefringence functional layer. In such a case, a distance between the transparent base materials cannot be brought closer than an external diameter of the foreign matter, so that there is a problem in that cell assembly itself is impossible.

The invention intends to overcome the above-mentioned problems and has an object to provide a retardation control element capable of inhibiting a retardation defect that causes light leakage and color shift of a liquid crystal display device from generating, a liquid crystal display device with the retardation control element, and a method of producing the retardation control element.

The invention is based on a technology where a maximum diameter and the number per unit area of foreign matters present on a surface or inside of a birefringence functional layer are set to definite limit values or less to inhibit occurrence of the retardation defect that causes the light leakage and color shift of a liquid crystal display device.

More specifically, a retardation control element involving the invention and a liquid crystal display device therewith, in summary, includes:

(1) a retardation control element including: a light-transmitting base material; and a birefringence functional layer obtained by mutually crosslinking and polymerizing crosslinkable liquid crystal compounds coated directly or indirectly on the base material, wherein a maximum outer diameter of foreign matters present on a surf ace or inside of the birefringence functional layer is 7 μm or less, the number per unit area of the foreign matters having an outer diameter in the range of 0.2 to 2 μm is 15 pieces/mm$^2$ or less, the number per unit area of the foreign matters having an outer diameter in the range of 2 to 5 μm is 10 pieces/mm$^2$ or less, and the number per unit area of the foreign matters having an outer diameter in the range of 5 to 7 μm is 5 pieces/mm$^2$ or less;

(2) a retardation control element including: a light-transmitting base material; and a birefringence functional layer obtained by mutually crosslinking and polymerizing crosslinkable liquid crystal compounds coated directly or indirectly on the base material, wherein a maximum outer diameter of foreign matters present on a surface or inside of the birefringence functional layer is 5 μm or less, the number per unit area of the foreign matters having an outer diameter in the range of 0.2 to 2 μm is 15 pieces/mm$^2$ or less, and the number per unit area of the foreign matters having an outer diameter in the range of 2 to 5 μm is 5 pieces/mm$^2$ or less;

(3) the retardation control element as recited in the item (1), wherein a thickness of the birefringence functional layer is in the range of 1 to 3 μm;

(4) the retardation control element as recited in the item (2), wherein a thickness of the birefringence functional layer is in the range of 1 to 3 μm;

(5) the retardation control element as recited in the item (1), wherein columns having height in the range of 2.5 to 5 μm from the surface of the birefringence functional layer are erected in a dispersed manner directly or indirectly on the surface of the base material;

(6) the retardation control element as recited in the item (2), wherein columns having height in the range of 2.5 to 5 μm from the surface of the birefringence functional layer are erected in a dispersed manner directly or indirectly on the surface of the base material;

(7) the retardation control element as recited in the item (1), wherein a coloring layer coated with a coloring material is formed between the base material and the birefringence functional layer or directly or indirectly on the birefringence functional layer;

(8) the retardation control element as recited in the item (2), wherein a coloring layer coated with a coloring material is formed between the base material and the birefringence functional layer or directly or indirectly on the birefringence functional layer;

(9) the retardation control element as recited in the item (1), wherein a coloring layer coated with a coloring material is formed between the base material and the birefringence functional layer, and a horizontal alignment film for horizontally aligning liquid crystal molecules is formed on the birefringence functional layer;

(10) the retardation control element as recited in the item (2), wherein a coloring layer coated with a coloring material is formed between the base material and the birefringence functional layer, and a horizontal alignment film for horizontally aligning liquid crystal molecules is formed on the birefringence functional layer;

(11) a liquid crystal display device including:
the retardation control element of the item (9);
another light-transmitting base material including a liquid crystal driving electrode and a horizontal alignment film and arranged facing the retardation control element; and
a driving liquid crystal layer arranged between the horizontal alignment film of the retardation control element and the horizontal alignment film of the another light-transmitting base material; and (12) a liquid crystal display device including:
the retardation control element of the item (10);
another light-transmitting base material including a liquid crystal driving electrode and a horizontal alignment film and arranged facing the retardation control element; and
a driving liquid crystal layer arranged between the horizontal alignment film of the retardation control element and the horizontal alignment film of the another light-transmitting base material.

Further, a method of producing a retardation control element involving the invention, which can reduce a maximum diameter of foreign matters present on a surface or inside of a birefringence functional layer and the number thereof per unit area to definite limits or less, in summary, includes:

(13) a method of producing a retardation control element, including:
a first step of filtering liquid crystal ink containing crosslinkable liquid crystal molecules with a filter material having a maximum pore diameter in the range of 0.1 to 5 μm;
a second step of coating the filtered liquid crystal ink in a thin film stripe on a light-transmitting base material;
a third step of, after drying the base material under reduced pressure as needs arise, heating the coated liquid crystal ink to a liquid crystal phase temperature to align the crosslinkable liquid crystal molecules; and
a fourth step of photo-polymerizing the aligned crosslinkable liquid crystal molecules each other to form a birefringence functional layer;

(14) a method of producing a retardation control element, including:
coating liquid crystal ink containing crosslinkable liquid crystal molecules in a thin film on a revolving light-transmitting base material by means of a spin coating method;

heating, after drying the base material under reduced pressure as needs arise, the coated liquid crystal ink to a liquid crystal phase temperature to align the crosslinkable liquid crystal molecules; and photo-polymerizing the aligned crosslinkable liquid crystal molecules each other to form a birefringence functional layer, wherein the step of coating the liquid crystal ink in a thin film is carried out with the base material covered with a tight cover; and (15) a method of producing a retardation control element, including:

a first step of filtering liquid crystal ink containing crosslinkable liquid crystal molecules with a filter material having a maximum pore diameter in the range of 0.1 to 5 μm;

a second step of coating the filtered liquid crystal ink in a thin film on a revolving light-transmitting base material by means of a spin coating method;

a third step of, after drying the base material under reduced pressure as needs arise, heating the coated liquid crystal ink to a liquid crystal phase temperature to align the crosslinkable liquid crystal molecules; and a fourth step of photo-polymerizing the aligned crosslinkable liquid crystal molecules each other to form a birefringence functional layer, wherein the second step is carried out with the base material covered with a tight cover.

The term "birefringence functional layer" means a layer that has a retardation control function capable of optically compensating for a change in an optical phase difference (retardation).

According to the invention, the alignment properties of crosslinkable liquid crystal molecules coated on an in-cell side of a base material can be reduced in disturbance due to foreign matters mingled between the liquid crystal molecules, thereby to obtain a birefringence functional layer excellent in the optical performance. Furthermore, according to the invention, when a liquid crystal display device provided with a driving liquid crystal layer having a general thickness is formed, a high quality liquid crystal display device can be obtained, in which cell assembly of a liquid crystal cell is not disturbed, foreign matters adhered on a surface of a birefringence functional layer do not deteriorate the alignment properties of the driving liquid crystal molecules of a liquid crystal cell, and the light leakage or color shift are not generated.

DETAILED DESCRIPTION OF THE INVENTION

Figure 1:
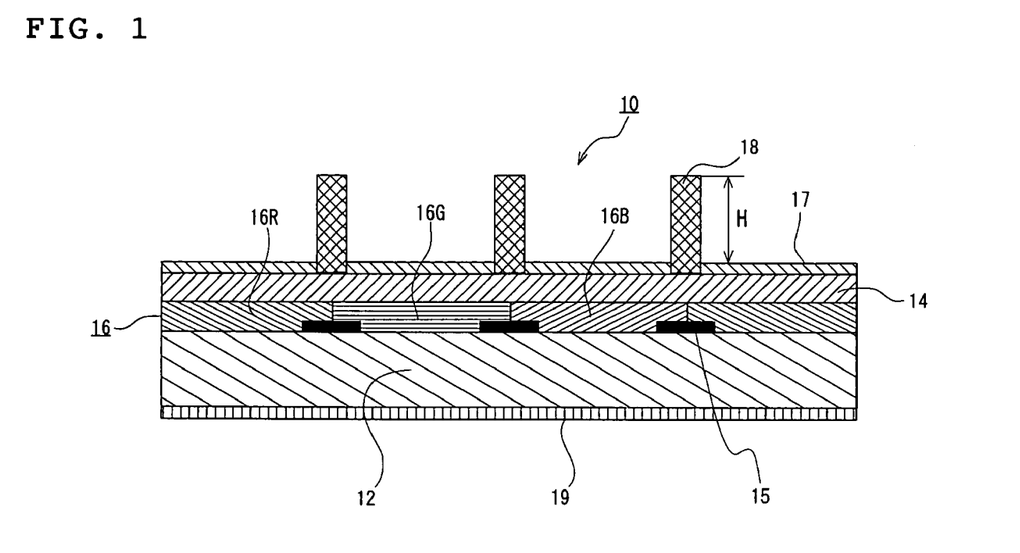
FIG. 1 is a schematic sectional view showing a lamination structure of a retardation control element 10 according to an embodiment of the invention.

Hereinbelow, the best modes for carrying out the invention will be described. FIG. 1 is a schematic sectional view showing a lamination structure of a retardation control element according to an embodiment. A retardation control element 10 includes at least a light-transmitting base material 12 and a birefringence functional layer 14 coated and formed directly or indirectly on the base material 12. In the retardation control element 10 of the embodiment, furthermore, a black matrix (BM) 15 and a coloring layer 16 are formed between the base material 12 and the birefringence functional layer 14 and a column or column spacer 18 is erected on the base material 12. Whether the black matrix 15, the coloring layer 16 and the column 18 are formed on the base material 12 or not is optional.

<Base Material>

As the base material 12 specifically usable are inorganic materials such as glass, silicon or quartz, and organic base materials cited below. Examples of the organic base materials include polymethyl methacrylate, polyamide, polyacetal, polybuthylene terephthalate, polyethylene terephthalate, polyethylene naphthalate, triacetyl cellulose, or syndiotactic polystyrene, polyphenylene sulfide, polyether ketone, polyether ether ketone, fluorine-contained resin, polyether nitrile, polycarbonate, modified polyphenylene ether, polycyclohexene, polynorbornene, or polysulfone, polyether sulfone, polysulfone, polypropylene, polyarylate, polyamide imide, polyether imide, polyether ketone or thermoplastic polyimide. A thickness of the base material 12 is in the range of 5 μm to 3 mm, depending on applications.

<Liquid Crystal Ink>

The liquid crystal ink for obtaining a birefringence functional layer 14 contains crosslinkable liquid crystal molecules. As such a crosslinkable liquid crystal material available is a crosslinkable nematic liquid crystal material capable of freely setting horizontal alignment, vertical alignment or hybrid alignment. Examples of the crosslinkable nematic liquid crystal materials include a monomer, an oligomer or a polymer that has at least one polymerizable group such as a (meth)acryloyl group, an epoxy group, an oxetane group or an isocynate group in one molecule. Specific examples of the polymerizable liquid crystal material include one kind of compounds represented by formula (1) shown by [Chem 1] below or a mixture of at least two kinds thereof, one kind of compounds represented by formula (2) shown by [Chem 2] below or a mixture of at least two kinds thereof, one kind of compounds represented by [Chem 3] and [Chem 4] below or a mixture of at least two kinds thereof, and a mixture of them. In particular, at least one kind of the crosslinkable nematic liquid crystal materials that constitute the crosslinkable liquid crystal material of the invention preferably contains at least one (meth)acryloyl group in one molecule.

[Chem 1]

(1)

-continued

In the formula (1) shown in [Chem 1], $R^1$ and $R^2$ each denote hydrogen or a methyl group. In order to make a temperature range where a crosslinkable liquid crystal material shows a liquid crystal phase broader, preferably at least one of $R^1$ and $R^2$ is hydrogen, and more preferably both of $R^1$ and $R^2$ are hydrogen. X in the formula (1) and Y in the formula (2) may be any one of hydrogen, chlorine, bromine, iodine, an alkyl group having 1 to 4 carbon atoms, a methoxy group, a cyano group or a nitro group and are preferably chlorine or a methyl group. "a" and b each showing a chain length of an alkylene group between a (meth)acryloyloxy group and an aromatic ring at both terminals of a molecular chain of the formula (1), and d and e in the formula (2) may be individually and independently an arbitrary integer in the range of 2 to 12, preferably in the range of 4 to 10, and more preferably in the range of 6 to 9. The compounds shown in formula (1) where a=b=0 or the formula (2) where d=e=0 is less stable, likely to be hydrolyzed and high in the crystallinity. Further, the compounds shown in formula (1) or (2) where "a" and b or d and e, respectively, are 13 or more is low in the isotropic phase transition temperature (TI). For this reason, in all of the compounds, a temperature range where the liquid crystal properties are stably exhibited (a temperature range where a liquid crystal phase can be maintained) becomes narrower, resulting in being unfavorable to use in the liquid crystal ink.

As the crosslinkable liquid crystal material blended in a liquid crystal composition, polymerizable liquid crystal monomers are exemplified in the [Chem 1] to [Chem 4]. However, a polymerizable liquid crystal oligomer or a polymerizable liquid crystal polymer may be used. As to these as well, known ones such as oligomers or polymers such as [Chem 1] to [Chem 4] can be appropriately selected and used.

A polymerization initiator such as a photopolymerization initiator may be blended in the liquid crystal ink. As the photopolymerization initiator usable is a radical polymerization initiator. The radical polymerization initiator is a compound that generates a free radical owing to energy of UV light. Examples of the radical polymerization initiators preferably include benzophenone derivatives such as benzoin and benzophenone or derivatives such as esters thereof; xanthone and thioxanthone derivatives; halogen-containing compounds such as chlorosulfonyl, chloromethyl polynuclear aromatic compounds, chloromethyl heterocyclic compounds and chloromethyl benzophenones; triazines; fluorenones; haloalkanes; redox couples of a photo-reducing dye and a reducing agent; organic sulfur compounds; and peroxides. Examples of the photopolymerization initiators include ketone-based and biimidazole-based compounds such as Irgacure 184, Irgacure 369, Irgacure 651 and Irgacure 907 (trade name, produced by Ciba Specialty Chemicals), Darocure (trade name, produced by Merck Co., Ltd.), Adeka 1717 (trade name, produced by ADEKA CORPORATION.), and 2,2'-bis(o-chlorophenyl)-4,5,4'-tetraphenyl-1,2'-biimidazole (produced by Kurogane Kasei K. K.). The polymerization initiators can be used singularly or in a combination of at least two kinds thereof. When these are used in a combination of at least two kinds thereof, the polymerization initiators different in absorption wavelength are preferably combined and used so that absorption spectra thereof may not interfere with each other.

In order to improve the storage stability of the birefringence functional layer 14, a polymerization inhibitor may be added to the liquid crystal ink. Further, a sensitizer or a surfactant can be appropriately added within a range that does not damage the object of the invention.

The liquid crystal ink obtained by mixing the respective components, in order to improve the coating properties to the base material, can be handled in a solution state prepared by dissolving or suspending in a solvent. Unless particularly stated, the liquid crystal ink used herein means one in a solution state.

The solvent is not particularly restricted as far as it can dissolve solutes such as the crosslinkable liquid crystal materials and the polymerization initiator and does not disturb the performance of a counterpart material on which the solution is coated. Specific examples of the solvent include at least one kind of hydrocarbons such as benzene and toluene; ethers such as methoxybenzene; ketones such as methyl ethyl ketone; esters such as ethyl acetate and propylene glycol monomethyl ether acetate; amide solvents such as dimethyl formamide; halogen-based solvents such as tetrachloroethylene; alcohols such as t-butyl alcohol; and phenols such as parachlorophenol. When, with only one kind of solvent, the solubility of the solutes such as the crosslinkable liquid crystal molecules is insufficient or a counterpart material on which the solution is coated is likely to be damaged, at least two kinds of solvents are mixed and used to avoid the inconveniences.

<Method of Forming Birefringence Functional Layer>

The birefringence functional layer 14 is formed as follows. The liquid crystal ink containing crosslinkable liquid crystal molecules is coated on a base material 12 to form an ink layer, and as needs arise, solvent molecules are volatilized at a predetermined ratio by means of reduced pressure drying to be removed. Subsequently, the liquid crystal molecules are aligned in a predetermined direction to form a liquid crystal coating film, followed by photo-polymerizing and/or thermally polymerizing the liquid crystal molecules each other to fix an alignment state.

The crosslinkable liquid crystal molecules can be aligned in such a manner that by means of infrared irradiation, the ink layer is heated to a temperature where the contained crosslinkable liquid crystal molecules become a liquid crystal phase (liquid crystal phase temperature) or more and less than a temperature where the crosslinkable liquid crystal molecules become an isotropic phase (liquid phase).

The birefringence functional layer 14 can enjoy various kinds of optical functions depending on difference of the alignment properties of the liquid crystal molecules. Typical examples thereof include:

(a) a so-called positive C-plate where the crosslinkable liquid crystal molecules are vertically aligned (homeotropically aligned) and fixed, whereby optical axes of the liquid crystal molecules are directed in a normal line direction of a base material and an extraordinary refractive index larger than an ordinary refractive index is imparted in the normal line direction of the base material;

(b) a so-called negative C-plate where optical axes of liquid crystal molecules are directed in a base material and an extraordinary refractive index smaller than an ordinary refractive index is imparted in a normal line direction of the base material;

(c) a so-called positive A-plate where optical axes of liquid crystal molecules are in parallel with a base material and an extraordinary refractive index larger than an ordinary refractive index is imparted in an in-plane direction of the base material; and (d) a hybrid layer made of hybrid-aligned liquid crystal molecules where a tilt angle between an optical axis of a liquid crystal molecule and a base material gradually varies in an out-of-plane direction and having functions of the positive C-plate and the positive A-plate.

When a positive C-plate is prepared by use of the liquid crystal ink, the crosslinkable liquid crystal molecules contained in the liquid crystal ink may be vertically aligned by using a known vertical alignment film as an undercoat layer of the liquid crystal ink being coated or by sandwiching a coating film of the liquid crystal ink between known vertical alignment films. Also, in order to make the alignment state of the crosslinkable liquid crystal molecules more stable and secure, a vertical alignment aid may be blended with the liquid crystal ink. Specific examples of the vertical alignment aid include a surface coupling agent having a vertically arranged alkyl chains or fluorocarbon chains, such as lecithin or quaternary ammonium surfactant including HTAB (hexadecyl-trimethylammonium bromide), DMOAP (N,N-dimethyl-N-octadecyl-3-aminopropyl trimethoxysilyl chloride) or N-perfluorooctylsulfonyl-3-aminopropyltrimethyl ammonium iodide, a silane polymer and a long chain alkyl alcohol.

When the positive A-plate is prepared, an alignment restriction force due to a rubbing-treated horizontal alignment film is imparted to the crosslinkable liquid crystal molecules or a leveling agent is added that suppresses a surface free energy of the crosslinkable liquid crystal molecules to an air interface, whereby the molecules can be horizontally aligned.

When the negative C-plate is prepared, a known chiral agent may be added to the liquid crystal ink. When, in the liquid crystal ink having the chiral agent added thereto, the crosslinkable liquid crystal molecules are horizontally aligned similarly to the positive A-plate, so that a spiral pitch can be induced in the liquid crystal molecule. The chiral agent used in the invention does not necessarily have the cross-linkability. However, in view of the thermal stability of the birefringence functional layer obtained, and the like, a chiral agent is preferably used that has the cross-linkability allowing polymerizing with the crosslinkable liquid crystal molecules contained in the liquid crystal ink to fix a state where the cholesteric regularity is imparted to the crosslinkable liquid crystal molecules. As such a chiral agent, in particular, a chiral agent having a crosslinkable functional group at both terminals of its molecular structure is preferred from the viewpoint of improving the heat resistance of the birefringence functional layer.

In the case of a so-called hybrid layer being formed, for example, one interface is brought into contact with a vertical alignment film and the other interface is made an air interface, whereby, with the liquid crystal molecules on the one side vertically aligned and the liquid crystal molecules on the other side horizontally aligned, a tilt angle of the liquid crystal molecule in the middle thereof can be gradually varied based on a continuous elastic body theory.

The liquid crystal ink may be coated through an alignment film or directly on the base material 12 by use of printing methods such as a gravure printing method, an offset printing method, a relief printing method, a screen printing method, a transferring printing method, an electrostatic printing method and a plate-less printing method and coating methods such as a gravure coating method, a roll coating method, a knife coating method, an air knife coating method, a bar coating method, a dip coating method, a kiss coating method, a spray coating method, a die coating method, a comma coating method, an ink jet coating method, a spin coating method and a slit coating method. These methods can be carried out with commercially available printers or coaters. Among these, a die coating method, a slit coating method or a spin coating method can be preferably used from the viewpoint of more uniformly preparing a coating film in the invention.

When active radiation is illuminated on an alignment-imparted liquid crystal coating film, the crosslinkable liquid crystal molecules are each other crosslinked and polymerized due to an action of the polymerization initiator, thereby to form a birefringence functional layer 14. Furthermore, when the photo-polymerized birefringence functional layer 14 is further baked, the crosslinking polymerization degree is improved thereby to heighten the resistance to deterioration with time and the heat resistance.

A thickness of a birefringence functional layer is generally set, though varying depending on the difference of the alignment properties described in the (a) to (d) and required amount of retardation, in the range of about 0.5 to 3.0 µm and particularly to about 2 µm. Furthermore, the universal hardness thereof is, though varying depending on whether the baking is applied or not, heating conditions or a blending amount of an additive for curing, normally substantially in the range of about 100 to 300 [mN/mm$^2$].

<Amount of Foreign Matters in Birefringence Functional Layer>

A retardation control element 10 according to the invention is characterized in that a maximum diameter of foreign matters present on a surface or inside of the birefringence functional layer 14 and the number of the foreign matters contained per unit area necessarily satisfy predetermined numerical value ranges. The number of foreign matters contained per unit area [pieces/mm$^2$] in the invention means a numerical value obtained by dividing the number of bright points when the retardation control element 10 is observed from a normal line direction with a polarization microscope by an area of a viewing field [mm$^2$].

Specific allowable upper limit values of the number of foreign matters contained are as follows.

1) When the maximum diameter of foreign matters is more than 7 µm, a height of the foreign matters protruding from the surface of the birefringence functional layer becomes at least in the range of about 4 to 5 µm to exceed a thickness of a general driving liquid crystal layer, which makes cell assembly difficult. Accordingly, such large foreign matters should be avoided from being contained in the birefringence functional layer.

2) Foreign matters having the maximum diameter of 5 µm or more and 7 µm or less are preferably not present on the surface or inside of the birefringence functional layer. However, even when these are present, the number thereof contained per unit area is 5 or less, preferably 4 or less and most preferably 1 or less. When foreign matters having such a maximum diameter are present on the surface or in the proximity of the surface of the birefringence functional layer, a protrusion height of the foreign matters in some cases exceeds a thickness of a general driving liquid crystal layer. However, upon the cell assembly, in general, owing to a base material higher in the rigidity than the birefringence functional layer, (a) the foreign matters are pushed-in inside of the birefringence functional layer and (b) the foreign matters themselves are subjected to the push-in deformation, and accordingly, the cell can be assembled. When the number is in the above-mentioned range, the number of pixels where foreign matters are mingled is limited, with the result that deterioration of the optical characteristics of an entire retardation control element can be suppressed to a minimum.

3) Foreign matters having the maximum diameter of 2 µm or more and less than 5 µm are desirably not present as far as possible on the surface or inside of the birefringence functional layer. However, when these are present, the number thereof contained per unit area is 10 pieces or less, preferably 5 pieces or less and most preferably 2 pieces or less. When foreign matters having such a size are present on the surface or in the proximity of the birefringence functional layer, part thereof may project into the driving liquid crystal layer. However, an action of disturbing the alignment of the driving liquid crystal molecules in the pixels is weak and the number of the pixels is limited. Accordingly, a decrease in the optical characteristics of an entire retardation control element can be said a minimum.

4) When the maximum diameter of foreign matters is 1 µm or more and less than 2 µm, there is less fear that foreign matters protruded from the surface of the birefringence functional layer may disturb a movement of the driving liquid crystal molecules. Further, when the number of the foreign matters contained per unit area is suppressed to 15 pieces or less and preferably to 10 pieces or less, the aligning properties of the birefringence functional layer can be limited in lowering rate thereof.

5) In the case of the foreign matters of which maximum diameter is 0.2 μm or more and less than 1 μm, the fear that the foreign matters protruded from the surface of the birefringence functional layer may disturb the movement of the driving liquid crystal molecules can be neglected. Further, when the number thereof contained per unit area is set 15 pieces or less and preferably 10 pieces or less, the degree of lowering of the optical characteristics of the entire retardation control element can be suppressed to a less problematic level, even when the alignment properties of the crosslinkable liquid crystal molecules are locally disturbed in the proximity of the foreign matters.

Furthermore, a main reason by which the foreign matters having the maximum diameter categorized in the 4) or 5) deteriorate the optical characteristics of the birefringence functional layer 14 is common in a point that the alignment properties of the crosslinkable liquid crystal molecules are disturbed. Accordingly, when ranges of the numerical values of the maximum diameter are combined, that is, when foreign matters are grasped as ones having the maximum diameter of 0.2 μm or more and less than 2 μm, the number thereof contained per unit area is 15 pieces or less and preferably 10 pieces or less.

6) When foreign matters have the maximum diameter less than 0.2 μm, the foreign matters of numerical density to an extent contained in a birefringence functional layer produced according to a general method do not disturb the alignment properties of the birefringence functional layer or driving liquid crystal layer.

The birefringence functional layer may contain the foreign matters categorized in the respective dimensional ranges together. That is, the birefringence functional layer according to the invention may contain 10 pieces of foreign matters of 0.2 μm or more and less than 2 μm or less per unit area and 2 pieces or less of foreign matters of 2 μm or more and less than 5 μm per unit area at the same time.

In other words, it is preferable that foreign matters present on the surface or inside of the birefringence functional layer according to the invention are 7 μm or less in the maximum diameter, the number per unit area of the foreign matters having an outer diameter in the range of 0.2 to 2 μm is 15 pieces/mm$^2$ or less, the number per unit area of the foreign matters having an outer diameter in the range of 2 to 5 μm is 10 pieces/mm$^2$ or less, and the number per unit area of the foreign matters having an outer diameter in the range of 5 to 7 μm is 5 pieces/mm$^2$ or less. More preferably, the maximum diameter of the foreign matters is 5 μm or less, the number per unit area of the foreign matters having an outer diameter in the range of 0.2 to 2 μm is 15 pieces/mm$^2$ or less and the number per unit area of the foreign matters having an outer diameter in the range of 2 to 5 μm is 5 pieces/mm$^2$ or less. Most preferably, the maximum diameter of the foreign matters is 5 μm or less, the number per unit area of the foreign matters having an outer diameter in the range of 0.2 to 2 μm is 10 pieces/mm$^2$ or less and the number per unit area of the foreign matters having an outer diameter in the range of 2 to 5 μm is 2 pieces/mm$^2$ or less.

Typical factors by which the foreign matters mingle on the surface or inside of the birefringence functional layer 14 are as cited in the above (i) to (v). When anyone of the factors is inhibited from occurring and thereby a mingling amount of the foreign matters is reduced, the optical characteristics and the yield of the retardation control elements 10 can be improved. It goes without saying that a plurality of factors are preferably removed.

In order to inhibit the initial impurities in the liquid crystal material, the factor (i), from occurring, the liquid crystal ink can be effectively filtered with a filter material. The filter material is largely divided into a surface method where pore diameters of the surface of the filter material are uniform and the surface removes foreign matters like a sieve and a depth method where pores of the surface of the filter material have irregular diameters and a predetermined thickness and the foreign matters are filtered deep inside thereof. In the invention, either type can be used. Preferable examples of the shape of the filter material include a filament type, a felt type, a mesh type, a cartridge type and a disc type.

Each of the filter materials can be categorized into a membrane type and a bobbin type depending on producing methods. The filter materials prepared by any producing method may be used. A material thereof is not particularly restricted to use as far as it has the filtering properties and the solvent resistance and does not adversely affect on the liquid crystal ink.

Specifically, usable is at least one kind of stainless, polyethylene, polypropylene, nylon, cellulose acetate, cellulose, cellulose-mixed ester, polytetrafluoroethylene (PTFE), polyester and polycarbonate or a mixture of at least two kinds thereof.

The smaller maximum pore diameter of the filter material is the better because the maximum diameter of the foreign matters remaining in the liquid crystal ink after a filtering process can be made smaller. However, the smaller the maximum pore diameter of the filter material is, the longer a time necessary for filtering becomes, because of an increase in the filtering pressure. Accordingly, in the invention, the maximum pore diameter of the filter material is in the range of 0.1 to 5 μm, preferably in the range of 0.1 to 2 μm and more preferably in the range of 0.1 to 0.5 μm. In particular, in the case of a depth type filter material being used, the liquid crystal ink is made to pass a plurality of times through the filter material to improve the removal efficiency of the foreign matters. In the case where the liquid crystal ink is made to pass a plurality of times through the filter material, a filter material is gradually replaced from one large in the maximum pore diameter to one small in the maximum pore diameter, thereby suppressing a demerit accompanying an increase in the filtering time.

As an example of a method of inhibiting a solid resin component from mingling from a discharge port of a coating machine, that is, the factor (ii), a discharge port of a coating machine for the liquid crystal ink may be periodically cleansed. For example, when the liquid crystal ink is coated by means of a gravure printing method, a die coating method, an ink jet method, a spray coating method or a spin coating method, respectively, a gravure plate, a lip of a die coater, an ink jet nozzle or a discharge nozzle is cleansed for every definite coating amount thereby to inhibit dry liquid crystal ink from mingling.

One method of inhibiting the solid resin component due to the crosslinking unevenness, that is, the factor (iii), from occurring includes a step of filtering the liquid crystal ink by use of a filter material. That is, the foreign matters are separated by filtering from the liquid crystal ink, whereby the alignment properties of the liquid crystal molecules are improved and the crosslinking reactions can be more uniformly carried out. In the crosslinking step, active radiation is illuminated to crosslink and polymerize the liquid crystal molecules prior to heating and baking of the liquid crystal coating film where the liquid crystal molecules are aligned in a predetermined direction. The crosslinking step as well becomes a factor that inhibits the factor (iii) from occurring. This is because when active radiation is illuminated over an entire surface of the liquid crystal coating film having the photopolymerization initiator dispersed therein to photo-polymerize the liquid crystal molecules each other, a polymerization reaction is generated and forwarded simultaneously on the surface and inside of the liquid crystal coating film owing to excellent transmittance of the active radiation. On the other hand, when the liquid crystal coating film is heated to thermally polymerize the liquid crystal molecules without photo-polymerizing the liquid crystal molecules, the polymerization reaction proceeds from the surface of the liquid crystal coating film to the inside thereof, with the result that drying unevenness is inevitably caused.

One of methods of inhibiting dusts adhered on the surface of the liquid crystal coating film, that is, the factor (iv), from occurring includes a method where a birefringence functional layer is coated with a surface of a base material covered with a tight cover (closed cup coating method).

Specifically, description will be given to an example where, according to a spin coating method that employs a commercially available spin coater provided with a turntable rotated by a motor, liquid crystal ink is coated on a base material. In the beginning, a shallow-bottomed tight cup (closed cup) is arranged freely elevatable to the turntable with an opening thereof directed toward the turntable. The tight cup has an aperture diameter capable of covering an entirety of a region, that is destined to be coated with the liquid crystal ink, of a base material placed on the turntable. The aperture diameter of the closed cup is not restricted particularly as far as it can cover the entirety of the region that is destined to be coated with the liquid crystal ink, and it may be one that can cover the entirety of the turntable, for example.

Next, the closed cup is elevated to release the turntable and in this state the base material is placed and fastened on the turntable. Subsequently, the liquid crystal ink is dropped on a center portion or in the proximity of the base material, followed by lowering the closed cup so as to cover the base material. The closed cup may be lowered until it comes into contact with the turntable or may be out of contact with the turntable with a predetermined clearance remained therebetween. In the former case, dusts can be advantageously inhibited from adhering since an air tight space is formed on the substrate. In the latter case, since the closed cup and the turntable are out of contact, there is no need of driving the closed cup in response to the rotation of the turntable. Accordingly, in the latter case, a spin coater can be simplified and dusts that cause the foreign matters can be advantageously inhibited from occurring.

When the turntable is rotated in this state, the liquid crystal ink can be coated, owing to a centrifugal force, in a thin film on the base material. Consequently, dusts derived from human proteins do not come into contact with the liquid crystal ink in a step of coating the liquid crystal ink, in which dusts are most likely to adhere on the surface of the birefringence functional layer.

Such a closed cup coating method, when applied in a clean room, can further inhibit the foreign matters from mingling in the liquid crystal ink.

Furthermore, the closed cup coating method can be applied also when the liquid crystal ink is coated on a base material by means of a method other than the spin coating method. For example, when an ink layer coated on a substrate by means of, for example, a slit coating method is dried under reduced pressure to vaporize a solvent, the substrate is preferably transported in a state covered with a closed cup from the slit coater to a reduced pressure dryer.

A material of the closed cup and specific shape and dimension thereof are not particularly restricted. As far as the factor (iv) can be inhibited from occurring, the air-tightness between the base material and the closed cup is not severely demanded. Furthermore, a reduced pressure drying step that is applied after the liquid crystal ink is coated, a step of heating the liquid crystal molecules to an alignment temperature to impart alignment properties to form a liquid crystal coating film and a step of crosslinking and polymerizing aligned liquid crystal molecules to solidify may be also applied in a state covered with the closed cup. In this case, it is optional whether inside of the closed cup provided are a heater and an active radiation illuminator or heating and active radiation illumination are extraneously applied with a light-transmitting closed cup.

According to the closed cup coating method, resin precipitates due to drying unevenness, that is, the factor (v), can be inhibited from occurring. That is, when, in a state covered with the closed cup, the liquid crystal ink is coated and the solvent is dried, the inside of the closed cup becomes a vapor atmosphere of the solvent. Accordingly, a subsequent drying speed of the solvent can be suppressed and the solvent can be inhibited from rapidly drying, with the result in reduction of occurrence of the drying unevenness and resin precipitates caused thereby. A gas of the solvent separated from the liquid crystal ink and filling the closed cup is evacuated from a gap between the base material and the closed cup or an exhaust port arranged to the closed cup, which allows subsequent evaporation and drying of the solvent. Also in the case where there is a predetermined clearance between the closed cup and the substrate as well, vapor of an evaporated solvent stays at a high concentration in the neighborhood of the upper portion of the ink layer, which allows to exert the function of the closed cup of preferably suppressing the vaporizing speed of the solvent.

When a depth of the closed cup is set to substantially one tenth or less an aperture diameter thereof to form a shallow-bottomed one that makes an interior volume to an aperture area as small as possible or when the closed cup is filled with a solvent vapor in advance, the liquid crystal ink can be more slowly dried at the start of the drying step. Further, when the clearance between the closed cup and the turntable is set at substantially 5 mm or less, the inside of the closed cup can be maintained in a vapor atmosphere of the solvent while inhibiting the dusts from intruding in the closed cup.

Another method of inhibiting the factor (v) from occurring is, for example, a method of selecting a solvent for use in the liquid crystal ink, which has a preferable evaporation speed. When the evaporation speed of the solvent is extremely high, there is fear that, due to the drying unevenness, resin precipitates are generated much. When the evaporation speed of the solvent is extremely slow, on the other hand, occurrence frequency of adherence of the dusts, that is, the factor (iv), becomes higher to be excessive in a layering time of a birefringence functional layer. For this reason, the upper and lower limit values of the preferable evaporation speed are defined.

From the above-mentioned viewpoints, in the invention, a relative evaporation speed of a solvent for use in the liquid crystal ink, which is measured according to a gravimetric method where an evaporation speed of n-butyl acetate at 25° C. is assigned to 100, is preferably in the range of 5 to 50, more preferably in the range of 10 to 40 and particularly preferably in the range of 10 to 25. When the relative evaporation speed of the solvent is in the range of 5 to 50, there is an advantage that when a birefringence functional layer is formed with liquid crystal ink prepared with the solvent, it is possible to prevent occurrence of so-called haze unevenness that is macroscopic unevenness appearing hazily on the surface of the layer. When the relative evaporation speed is in the range of 10 to 40, the drying unevenness is difficult to occur when the ink layer is heated and dried or dried under reduced pressure to evaporate a solvent. Further, since the relative evaporation speed is 10 or more, the drying time of the liquid crystal ink coated on the surface of the base material can be inhibited from becoming too long. In a solvent of which relative evaporation speed is 40 or less and ideally 25 or less, the liquid crystal ink coated on the surface of the base material can be dried within an appropriate time and uniformly, and accordingly, the drying unevenness can be inhibited from occurring or can be reduced. From the above, when the relative evaporation speed is in the range of 10 to 40, the drying unevenness tends to be preferably inhibited from occurring irrespective of the kind of the solvent. Further, when the relative evaporation speed is in the range of 10 to 25, particularly preferably, the drying unevenness can be remarkably inhibited from occurring.

The relative evaporation speed of the solvent means, when a single solvent is used to prepare a solution of liquid crystal ink, a relative evaporation speed of the single solvent. Further, a plurality of solvents may be mixed to prepare a liquid crystal composition solution. In such a case, even when an evaporation speed of any one of solvents is outside of the preferable range, the above-mentioned advantage can be acquired if the relative evaporation speed in a state where a plurality of solvents are mixed is in the preferable range.

In particular, examples of solvents that can be preferably used as a single solvent include propylene glycol monomethyl ether acetate (relative evaporation speed: 34), ether 1,2-dichlorobenzene (relative evaporation speed: 12), ethylene glycol monoethyl ether acetate (relative evaporation speed: 21), 3-ethoxyethyl propionate (relative evaporation speed: 12), 3-methyl-3-methoxybutyl acetate (relative evaporation speed: 10), cyclohexanone (relative evaporation speed: 23), 4-hydroxy-4-methyl-2-pentanone (relative evaporation speed: 14), 2,6-dimethyl-4-heptanone (relative evaporation speed: 18), ethylene glycol mono-t-butylether (relative evaporation speed: 19), ethylene glycol monobutyl ether (relative evaporation speed: 6) and 3-methyl-3-methoxy butanol (relative evaporation speed: 5). The solvents can be used singularly or in a mixed state of at least two kinds thereof. What are mentioned above are only examples of solvents showing preferable relative evaporation speed that can be used in the invention. As far as the solvent is a general known one having the relative evaporation speed in the range of 3 to 50, it can be appropriately selected and used in consideration of the solubility of the crosslinkable liquid crystal molecules.

For example, an optical observation such as shown below can be used as a method of measuring outer diameters and the number of foreign matters present on a surface or inside of a birefringence functional layer formed on a substrate.

That is, a polarization microscope with a scale is used to, with transmission axes of upper and lower polarizers set orthogonal to each other (Cross Nicol arrangement), observe a retardation control element from a direction perpendicular to a plane at a magnification of for example 100 times, followed by measuring the sizes and the number of bright spots. The measurement is preferable performed while classifying and summarizing for every outer diameter dimension, for example, the numbers of foreign matters in the range of 0.2 to 2 μm, 2 to 5 μm, 5 to 7 μm and so on. After the observation, when the summarized number is divided by an area of viewing field, the number of foreign matters contained per unit area can be obtained for every outer diameter of the foreign matters.

<Retardation Control Element>

The retardation control element 10 according to the embodiment, of which lamination structure is schematically shown in FIG. 1, includes a coloring layer 16 in addition to the base material 12 and the birefringence functional layer 14, and works as a color filter that selects and absorbs a predetermined wavelength from transmitted visible light.

The retardation control element 10 is formed such that, on one surface of the base material 12, a plurality of black matrixes 15 made of a light-shielding material are formed in a dispersed manner in, for example, lattice patterns, and a region where the black matrix is not formed becomes a light-transmitting opening. In the opening, color patterns 16R, 16G and 16B of three colors of red (R), green (G) and blue (B) are arranged in strip to form a coloring layer 16. When the retardation control element 10 is assembled in a liquid crystal display device 20 described below, the three adjacent openings provided with the color patterns 16R, 16G and 16B of three colors together form one pixel (picture element).

Each of the color patterns 16R, 16G and 16B is formed in such a manner that a coloring material obtained by dispersing a pigment corresponding to individual color in a binder is coated on an appropriate position on the base material 12 according to an ink jet method or a photolithography method, followed by drying or solidifying. Though varying in the thickness of the coloring layer 16 depending on a dispersion concentration of a pigment, usually the coloring layer 16 is formed at a thickness of about 3 μm.

In the embodiment exemplified is the retardation control element 10 provided with a color pattern of three colors of RGB. In the invention, however, a mono-color, two-color or 4 or more-color pattern may be provided, and shapes of the black matrix 15 and color patterns 16R, 16G and 16B are arbitrary. Furthermore, on a top surface of the coloring layer 16, preferably formed is an optically isotropic protective layer (not shown) having a layer thickness of about 3 μm to thereby cover up the unevenness of the surface of the coloring layer and reduce the unevenness in a coating thickness of a driving liquid crystal material.

On the top surface of the birefringence functional layer 14 coated and formed is an alignment film 17 for aligning driving liquid crystal molecules. When the retardation control element 10 is used as a display side substrate of an IPS-type or TN-type liquid crystal display device, a horizontal alignment film is formed as the alignment film 17. A horizontal alignment film can be formed by use of a known producing method such as a method of rubbing a polyimide film or a method of optically processing a transparent resin material to impart an alignment restricting force. A thickness of the alignment film 17 is generally about 0.05 μm.

In the retardation control element 10, columns 18 are erected in a dispersed manner corresponding to arrangement positions of the black matrixes 15. Each column 18 is a spacer for accurately and reproducibly defining a coating thickness of driving liquid crystal molecules, and a height H with which the column 18 stands upward from the alignment film 17 corresponds to a layer thickness of the driving liquid crystal molecules. The column 18 is made of acrylic, amide or esteric polymer materials containing a polyfunctional acrylate, and erected on the base material 12 by a photolithography method, a transferring method or the like. Specifically, other than erecting the column 18 from the surface of the base material 12, various kinds such as erecting on the surface of the birefringence functional layer 14 as shown in the drawing can be adopted. The height H of the column 18 can be determined corresponding to a retardation amount imparted to visible light having transmitted through a driving liquid crystal layer and a driving method for driving liquid crystal molecules, and is generally in the range of 2.5 to 5 μm.

On an out-cell side of the base material 12 (lower side in FIG. 1), a linear polarization plate 19 is adhered with an adhesive. A retardation control layer (not shown) may be formed between the linear polarization plate 19 and the base material 12 separately from the birefringence functional layer 14.

<Liquid Crystal Display Device>

Figure 2:
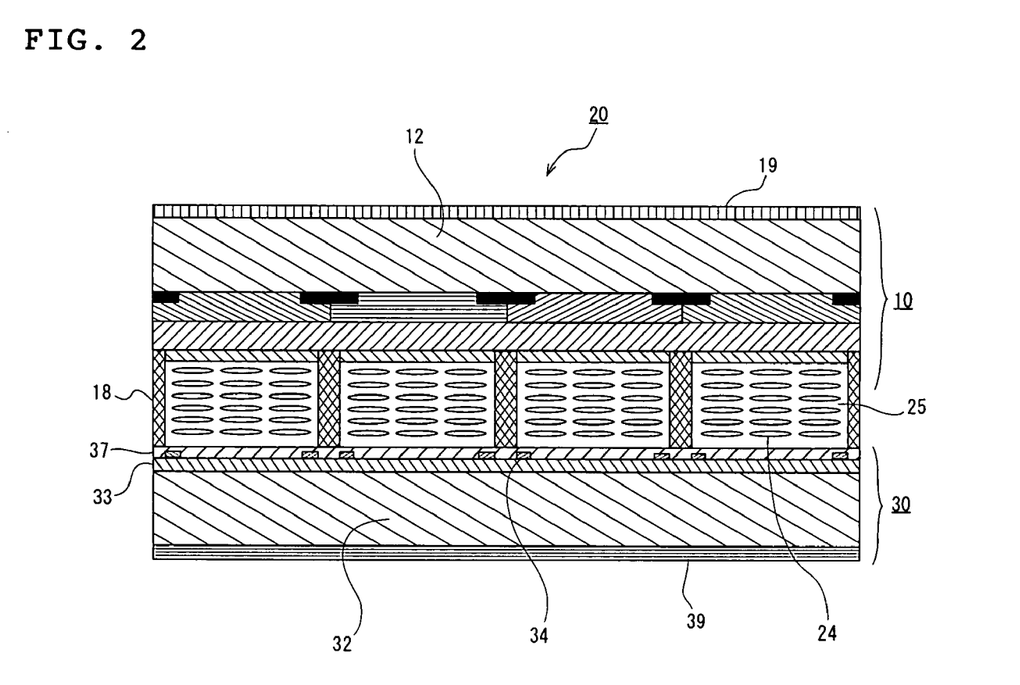
FIG. 2 is a schematic sectional view showing a lamination structure of a liquid crystal display device with a retardation control element 10 as a display side substrate.

FIG. 2 is a schematic sectional view showing a lamination structure of a liquid crystal display device 20 including the retardation control element 10 according to the embodiment as a display side substrate. The liquid crystal display device 20 is constituted by inserting driving liquid crystal molecules 24 between the alignment film 17 of the retardation control element 10 and an alignment film 37 formed on a top surface of a driving liquid crystal side substrate 30. The driving liquid crystal side substrate 30 includes, on an in-cell side that is a top surface of a transparent substrate 32, a driving circuit 33 and a liquid crystal driving electrode 34 arranged in a dispersed manner corresponding to the black matrixes 15. The driving circuit 33 switching drives the driving liquid crystal molecules 24, and the liquid crystal driving electrode 34 has its loading amount of voltage controlled by the driving circuit 33. On an out-cell side (lower direction in the drawing) of the driving liquid crystal side substrate 30 arranged is a linear polarization plate 39, and further on a back side of the linear polarization plate 39 arranged is a backlight unit (not shown).

A layer thickness of a driving liquid crystal layer 25 containing a lot of driving liquid crystal molecules 24 is defined by the height of the column 18. That is, in the case of so-called cell assembly where the driving liquid crystal side substrate 30 having the driving liquid crystal molecules 24 coated on the alignment film 37 and the retardation control element 10 are assembled while facing each other, the height of the column 18 from the retardation control element 10 becomes a thickness of the driving liquid crystal layer 25 unless excessively large foreign matters are mingled in the driving liquid crystal layer 25.

In the case of the liquid crystal display device 20 being an IPS system, the linear polarization plate 19 of the retardation control element 10 and a linear polarization plate 39 of the driving liquid crystal side substrate 30 are arranged so that mutual light absorption axes may be orthogonal, and a direction of any one of light absorption axes coincides with an optical axis of the driving liquid crystal molecule 24. In this case, both the alignment film 17 and alignment 37 are horizontal alignment films, and the liquid crystal driving electrode 34 rotatably drives the driving liquid crystal molecules 24 in a horizontal plane. Accordingly, in the driving liquid crystal layer 25, no phase difference occurs in the transmitted light. Furthermore, a positive A-plate (not shown) that optically compensates for the linear polarization plate in a cross nicol state is preferably adhered and formed between the linear polarization plate 19 and the base material 12.

EXAMPLES

Example 1

A mixture of compounds (a) to (d) shown by [Chem 5] below as a crosslinkable liquid crystal molecule, BHT (2,6-di-tert-butyl-4-hydroxytoluene) as a polymerization inhibitor, Irgacure 907 (trade name) as a polymerization initiator and dodecanol as an additive were mixed to prepare a crosslinkable liquid crystal composition (Composition A) having the following composition. The crosslinkable liquid crystal composition was prepared according to the description of JP-A-2004-524385. Weight ratios of the respective substances in the composition A shown below are weight ratios of the respective substances to a total weight of the composition A.

[Chem 5]

<Composition A>

| Compound (a) | 32.67% by weight |
| Compound (b) | 18.67% by weight |
| Compound (c) | 21.00% by weight |
| Compound (d) | 21.00% by weight |
| Dodecanol    | 1.02% by weight  |
| BHT          | 0.04% by weight  |
| Irgacure 907 | 5.60% by weight  |

The composition A was dissolved in propylene glycol monomethyl ether acetate (PGMEA) to prepare liquid crystal ink at a concentration of 20% by weight.

The obtained liquid crystal ink was made to pass through a filter paper (trade name: JMWP02500, produced by Millipore Corp.) having filtering accuracy of 5.0 μm, that is, having the maximum pore diameter of 5.0 μm to remove contained foreign matters. At the filtering, filtering pressure was set to 0.2 [kgf/cm$^2$]=2.0·10$^4$ [Pa] and a temperature of the liquid crystal ink was set at 25[° C].

Next, as an appropriately cleansed transparent substrate, a glass substrate (trade name: 1737 Glass, produced by Corning Glass Corp.) having a size of 100×100 mm and a thickness of 0.7 mm was set on a spin coater (trade name: 1H-360S, produced by Mikasa K. K.), the liquid crystal ink was dropped on the glass substrate, followed by, with the entire glass substrate covered with a closed cup (depth: 20 mm, clearance with the substrate: 2 mm and aperture diameter of closed cup: 250 mm), rotating a spin coater to form an ink layer.

Then, the ink layer formed on the substrate was dried under reduced pressure of 0.20 [torr], followed by heating at 80° C. with a hot plate to vertically align liquid crystal molecules.

Subsequently, by use of a UV illuminator (trade name TOSCURE 751, produced by Toshiba-Harrison Lighting Co., Ltd.) having an ultra high-pressure mercury lamp, UV-ray having a wavelength of 365 nm was illuminated at 20 mW/cm$^2$ for 10 sec to crosslink crosslinkable liquid crystals, followed by baking at 230° C. for 30 min by use of an oven, thereby to form a birefringence functional layer having a function of a positive C-plate with a film thickness of 1.5 μm and a retardation control element having the birefringence functional layer on the glass substrate.

<Evaluation>

Optical performance of the birefringence functional layer according to the embodiment was evaluated from two viewpoints below.

1) Evaluation of Contained Foreign Matters

Used were five test pieces cut out from the obtained retardation control element and having a size of 100 mm×100 mm. By use of a polarization microscope with a scale (trade name: CX31-P, produced by Olympus K. K.), each of the test sheets was sandwiched between a pair of opposite polarizers possessed by the polarization microscope, which were set in a cross nicol state (black display). It was confirmed through entire observation at a low magnification factor that, in a plane of the test piece, there was no extreme unevenness in the numerical density of the contained foreign matters. Then, an arbitrary 1 mm×1 mm region of the test piece was observed from a direction vertical to the birefringence functional layer at a magnification of 1000 times. From the sizes and the number of observed bright spots having a size of 0.2 μmm or more, the number of the foreign matters per unit area was obtained for every diameter of the foreign matters. The evaluation was based on an average value of the five test pieces.

The maximum diameter of the foreign matters in each of the test pieces means, when a bright spot observed is a circle, a diameter thereof and, when a bright spot observed is other than the circle, a diameter of a circumscribed circle. Accordingly, when a foreign matter present inside of the birefringence functional layer 14 disturbs the alignment of liquid crystal molecules in the surroundings thereof to form a retardation defect region, a diameter of the foreign matter includes such a region in the invention. More specifically, a diameter of the foreign matter in the invention is not evaluated by a dimension of the foreign matter itself but a dimension of the retardation defect region caused due to the foreign matter. This is because, in the invention that intends to inhibit the optical characteristics of the birefringence functional layer 14 from deteriorating owing to mingling of the foreign matter, it is appropriate to evaluate not the dimension of the foreign matter itself but the magnitude of the retardation defect caused by the presence of the foreign matter.

The evaluation of the number of contained foreign matters determined as acceptable a case where the maximum outer diameter of foreign matters was 7 μm or less, the number per unit area of the foreign matters having an outer diameter in the range of 0.2 to 2 μm was 15 pieces/mm$^2$ or less, the number per unit area of the foreign matters having an outer diameter in the range of 2 to 5 μm was 10 pieces/mm$^2$ or less and the number per unit area of the foreign matters having an outer diameter in the range of 5 to 7 μm was 5 pieces/mm or less, and determined other cases than the above case as unacceptable.

2) Evaluation of Light Leakage

With the obtained retardation control element, a ratio (brightness ratio) between brightness in a white display state and brightness in a black display state was measured. Specifically, by use of the polarization microscope, with a pair of opposite polarizers kept in across nicol state (black display) or in a parallel nicol state (white display), a retardation control element according to the embodiment was sandwiched therebetween, followed by measuring the brightness of the respective transmitted lights. Whether light leaks in the black display state or not and the number of foreign matters per unit area were visually observed. The brightness was measured by use of EZ Contrast 160 (trade name, produced by ELDIM Corp.). A measurement score of the brightness ratio was set same as the evaluation score of the number of the contained foreign matters.

With the brightnesses in the white display state expressed and the black display state expressed by $T_{OFF}$ and $T_{ON}$, respectively, the light leakage was evaluated as follows. The results of the evaluation are shown in Table 1.

◉(Very good) . . . Light leakage is not visually observed and a $T_{ON}/T_{OFF}$ ratio is 1100 or more.

○(Good) . . . Light leakage is not visually observed and a $T_{ON}/T_{OFF}$ ratio is 1000 or more and less than 1100.

△(Fair) . . . Light leakage is visually apparently observed and a $T_{ON}/T_{OFF}$ ratio is 500 or more and less than 1000.

× (Bad) . . . Light leakage is visually apparently observed and a $T_{ON}/T_{OFF}$ ratio is less than 500.

Example 2

A birefringence functional layer was prepared and evaluated in the same manner as in Example 1, except that the filtering accuracy of the filtering paper was set to 3.0 μm. The evaluation results are shown in Table 1.

Example 3

A birefringence functional layer was prepared and evaluated in the same manner as in Example 1, except that the filtering accuracy of the filtering paper was set to 0.45 μm. The evaluation results are shown in Table 1.

Example 4

A birefringence functional layer was prepared and evaluated in the same manner as in Example 1, except that the filtering accuracy of the filtering paper was set to 0.2 μm. The evaluation results are shown in Table 1.

Example 5

A birefringence functional layer was prepared and evaluated in the same manner as in Example 1, except that a closed cup was not used in a step of coating liquid crystal ink by means of a spin coater. The evaluation results are shown in Table 1.

Example 6

A birefringence functional layer was prepared and evaluated in the same manner as in Example 4, except that a closed cup was not used in a step of coating liquid crystal ink by means of a spin coater. The evaluation results are shown in Table 1.

Comparative Example 1

A birefringence functional layer was prepared and evaluated in the same manner as in Example 1, except that the filtering accuracy of the filtering paper was set to 10.0 μm. The evaluation results are shown in Table 1.

Comparative Example 2

A birefringence functional layer was prepared and evaluated in the same manner as in Example 1, except that the filtering accuracy of the filtering paper was set to 40.0 μm. The evaluation results are shown in Table 1.

Comparative Example 3

A birefringence functional layer was prepared and evaluated in the same manner as in Example 1, except that a filtering paper was not used. The evaluation results are shown in Table 1.

TABLE 1

| | Filter Pore Diameter [μm] | Number of Contained Foreign Matters [pieces/mm$^2$] | | | | Closed Cup | Evaluation of Light Leakage | Overall Evaluation |
|---|---|---|---|---|---|---|---|---|
| | | 0.2~2 | 2~5 | 5~7 | Total | | | |
| Example 1 | 5.0 | 10 | 2 | 0 | 12 | Yes | ○ | ○ |
| Example 2 | 3.0 | 9 | 1 | 0 | 10 | Yes | ○ | ○ |
| Example 3 | 0.45 | 2 | 0 | 0 | 2 | Yes | ◎ | ◎ |
| Example 4 | 0.2 | 1 | 0 | 0 | 1 | Yes | ◎ | ◎ |
| Example 5 | 5.0 | 12 | 7 | 4 | 23 | No | Δ | Δ |
| Example 6 | 0.2 | 1 | 6 | 4 | 11 | No | Δ | ○ |
| Comparative Example 1 | 10.0 | 13 | 2 | 7 | 22 | Yes | Δ | X |
| Comparative Example 2 | 40.0 | 12 | 2 | 17 | 31 | Yes | X | X |
| Comparative Example 3 | Nonuse | 14 | 3 | 17 | 34 | Yes | X | X |

The specific numbers per unit area of foreign matters with the maximum diameter of 7.0 μm or more, which were found plurally in Comparative Examples 1 to 3 in Table 1, are omitted from describing in the table.

As obvious when comparing the examples and comparative examples, the birefringence functional layer according to the invention and the retardation control element including the same enable to suppress the maximum diameter of the foreign matters present on the surface or inside of the birefringence functional layer to 7 μm when liquid crystal ink is filtered in advance with a filter material having the maximum pore diameter of 5 μm or less. Further, it is found that, when a closed cup coating method is used together to coat the liquid crystal ink in a thin film by the spin coating method, dusts adhered to a surface of a coated liquid crystal film and resin precipitates generated by uneven drying can be inhibited from occurring, whereby the foreign matters having a diameter in the range of 5 to 7 μm can be suppressed, which contributes to improvement in the optical characteristics of the birefringence functional layer and the retardation control element including the birefringence functional layer. In other words, diameters of the foreign matters adhered to or generated on a surface of the liquid crystal coating film that is formed by the spin coating method are in the range of about 5 to 7 μm, and according to the closed cup method, such foreign matters can be inhibited from mingling.

What is claimed is:

1. A retardation control element, comprising:
   a light-transmitting base material; and
   a birefringence functional layer obtained by mutually crosslinking and polymerizing crosslinkable liquid crystal compounds coated directly or indirectly on the base material,
   wherein a maximum outer diameter of foreign matters present on a surface or inside of the birefringence functional layer is 7 μm or less, the number per unit area of the foreign matters having an outer diameter in the range of 0.2 to 2 μm is 15 pieces /mm$^2$ or less, the number per unit area of the foreign matters having an outer diameter in the range of 2 to 5 μm is 10 pieces/mm$^2$ or less, and the number per unit area of the foreign matters having an outer diameter in the range of 5 to 7 μm is 5 pieces/mm$^2$ or less.

2. A retardation control element, comprising:
   a light-transmitting base material; and
   a birefringence functional layer obtained by mutually crosslinking and polymerizing crosslinkable liquid crystal compounds coated directly or indirectly on the base material,
   wherein a maximum outer diameter of foreign matters present on a surface or inside of the birefringence functional layer is 5 μm or less, the number per unit area of the foreign matters having an outer diameter in the range of 0.2 to 2 μm is 15 pieces/mm$^2$ or less and the number per unit area of the foreign matters having an outer diameter in the range of 2 to 5 μm is 5 pieces/mm$^2$ or less.

3. The retardation control element according to claim 1, wherein a thickness of the birefringence functional layer is in the range of 1 to 3 μm.

4. The retardation control element according to claim 2, wherein a thickness of the birefringence functional layer is in the range of 1 to 3 μm.

5. The retardation control element according to claim 1, wherein columns having height in the range of 2.5 to 5 μm from the surface of the birefringence functional layer are erected in a dispersed manner directly or indirectly on the surface of the base material.

6. The retardation control element according to claim 2, wherein columns having height in the range of 2.5 to 5 μm from the surface of the birefringence functional layer are erected in a dispersed manner directly or indirectly on the surface of the base material.

7. The retardation control element according to claim 1, wherein a coloring layer coated with a coloring material is formed between the base material and the birefringence functional layer or directly or indirectly on the birefringence functional layer.

8. The retardation control element according to claim 2, wherein a coloring layer coated with a coloring material is formed between the base material and the birefringence functional layer or directly or indirectly on the birefringence functional layer.

9. The retardation control element according to claim 1, wherein a coloring layer coated with a coloring material is formed between the base material and the birefringence functional layer, and a horizontal alignment film for horizontally aligning liquid crystal molecules is formed on the birefringence functional layer.

10. The retardation control element according to claim 2, wherein a coloring layer coated with a coloring material is formed between the base material and the birefringence functional layer, and a horizontal alignment film for horizontally aligning liquid crystal molecules is formed on the birefringence functional layer.

11. A liquid crystal display device, comprising:
   the retardation control element of claim 9;
   another light-transmitting base material including a liquid crystal driving electrode and a horizontal alignment film and arranged facing the retardation control element; and
   a driving liquid crystal layer arranged between the horizontal alignment film of the retardation control element and the horizontal alignment film of the another light-transmitting base material.

12. A liquid crystal display device, comprising:
   the retardation control element of claim 10;
   another light-transmitting base material including a liquid crystal driving electrode and a horizontal alignment film and arranged facing the retardation control element; and
   a driving liquid crystal layer arranged between the horizontal alignment film of the retardation control element and the horizontal alignment film of the another light-transmitting base material.

13. A method of producing a retardation control element, comprising:
   a first step of filtering liquid crystal ink containing crosslinkable liquid crystal molecules with a filter material having a maximum pore diameter in the range of 0.1 to 5 μm;
   a second step of coating the filtered liquid crystal ink in a thin film on a light-transmitting base material;
   a third step of, after drying the base material under reduced pressure as needs arise, heating the coated liquid crystal ink to a liquid crystal phase temperature to align the crosslinkable liquid crystal molecules; and
   a fourth step of photo-polymerizing the aligned crosslinkable liquid crystal molecules each other to form a birefringence functional layer.

14. A method of producing a retardation control element, comprising:
   coating liquid crystal ink containing crosslinkable liquid crystal molecules in a thin film on a revolving light-transmitting base material by means of a spin coating method;
   after drying the base material under reduced pressure as needs arise, heating the coated liquid crystal ink to a liquid crystal phase temperature to align the crosslinkable liquid crystal molecules; and
   photo-polymerizing the aligned crosslinkable liquid crystal molecules each other to form a birefringence functional layer,
   wherein the coating the liquid crystal ink in a thin film is carried out with the base material covered with a tight cover.

15. A method of producing a retardation control element, comprising:
   a first step of filtering liquid crystal ink containing crosslinkable liquid crystal molecules with a filter material having a maximum pore diameter in the range of 0.1 to 5 μm;
   a second step of coating the filtered liquid crystal ink in a thin film on a revolving light-transmitting base material by means of a spin coating method;
   a third step of, after drying the base material under reduced pressure as needs arise, heating the coated liquid crystal ink to a liquid crystal phase temperature to align the crosslinkable liquid crystal molecules; and
   a fourth step of photo-polymerizing the aligned crosslinkable liquid crystal molecules each other to form a birefringence functional layer,
   wherein the second step is carried out with the base material covered with a tight cover.

* * * * *

UNITED STATES PATENT AND TRADEMARK OFFICE
CERTIFICATE OF CORRECTION

PATENT NO.        : 7,554,636 B2
APPLICATION NO. : 11/902623
DATED             : June 30, 2009
INVENTOR(S)       : Yuji Nakatsugawa

It is certified that error appears in the above-identified patent and that said Letters Patent is hereby corrected as shown below:

On the Title Page should read,

Item (73), please change "Dai Nippon Printing" to --Dai Nippon Printing Co., Ltd.--.

Signed and Sealed this

Eighth Day of December, 2009

David J. Kappos
*Director of the United States Patent and Trademark Office*